(12) United States Patent  
Randt (10) Patent No.: US 7,528,978 B2  
(45) Date of Patent: May 5, 2009

(54) SYSTEMS AND METHOD FOR CONTROLLING HIDE AND HOLD JOBS IN A NETWORK

(75) Inventor: Alan J. Randt, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 862 days.

(21) Appl. No.: 11/133,198

(22) Filed: May 20, 2005

(65) Prior Publication Data

US 2006/0268315 A1 Nov. 30, 2006

(51) Int. Cl.
*G06F 15/00* (2006.01)
*G06F 15/16* (2006.01)

(52) U.S. Cl. .................... 358/1.15; 709/229

(58) Field of Classification Search .......... 358/1.15, 358/1.14, 1.13, 1.16; 709/229, 223; 714/44, 714/57; 399/8, 81; 710/2, 36
See application file for complete search history.

(56) References Cited

U.S. PATENT DOCUMENTS

| | | | |
|---|---|---|---|
| 2002/0057455 A1* | 5/2002 | Gotoh et al. | 358/1.15 |
| 2003/0137685 A1* | 7/2003 | Meade et al. | 358/1.14 |
| 2003/0167336 A1* | 9/2003 | Iwamoto et al. | 709/229 |
| 2004/0021893 A1* | 2/2004 | Stevens et al. | 358/1.15 |
| 2005/0141006 A1* | 6/2005 | Aiyama | 358/1.13 |

* cited by examiner

*Primary Examiner*—Saeid Ebrahimi Dehkordy
(74) *Attorney, Agent, or Firm*—Oliff & Berridge, PLC (57) ABSTRACT

When a user submits a printer ready application or print job to a networked printing device, the print job is sent to the destination printer through a print driver. In a busy production or office environment, print jobs enter a print queue and are printed in the order they are received. The systems and methods of this disclosure include a user name/password as a job attribute on a job ticket to be sent along with the print job as an attribute for controlling/allowing the viewing and/or release of print jobs at a print server.

19 Claims, 6 Drawing Sheets

| PAGE CONTENT IDENTIFIER | | | |
|---|---|---|---|
| Global Info | | Attribute | Eligible Values |
| | | PPPrelease | XRX_PPP3.0 |
| | | TextAnnotation | none, monochrome, color |
| | | GraphicAnnotation | none, monochrome, color |
| | | Hide&HoldUname | 10 character (enforce) |
| | | Hide&HoldPassword | 10 character (special char. enforce) |
| | | ImageAnnotation | none |
| | | VariableData | false |
| TIFF IFD Relevant Information - Per Image (Tag Number) | | ImageList (see below) | One entry |
| | 377 | TargetPrinter | anything if L*a*b* or L*, if CMYK, the printer must match the Device Object |
| | 305 | Software | XRX_PPP3.0 |
| | 254 | NewSubfileType | 16 |
| | 262 | PhotometricInterpretation | 5, 9 |
| | 259 | Compression | TBD, 7 |
| | 293 | T6Options | 0 |
| | 257 | ImageLength | All, per comments |
| | 256 | ImageWidth | All, per comments |
| | 296 | ResolutionUnit | 2 |
| | 282 | XResolution | 300, 600 |
| | 283 | YResolution | same as XResolution |
| | 286 | XPosition | 0 |
| | 287 | YPosition | 0 |
| | 278 | RowsPerStrip | 288 |
| | 258 | BitsPerSample | <8,...> |
| | 277 | SamplesPerPixel | 1, 3, 4 |
| | 266 | FillOrder | 1 |
| | 274 | Orientation | 1, 3, 6, 8 (constratined by the imaging directions and CTM) |
| | 297 | PageNumber | <0,1> |
| | 530 | ChromaSubsampling | <1,1> |
| | 34732 | ImageLayer | <1,1> |
| non-TIFF Information, per image | | ImageXOrigin | 0 |
| | | ImageYOrigin | 0 |
| | | tif_filename | Unix file name and path, null if the file is embedded. |

*FIG. 3A*

From FIG. 3A

| Comments |
|---|
| The file creation application figures this out |
| Consistent with the PS content |
| Consistent with the PS content |
| Both H&H attributes required to Hide/Hold Job(s) |
| Both H&H attributes required to Hide/Hold Job(s) |
| No image annotation is allowed |
| No VIPP VI is allowed |
| Consistent with the PS content |
| 0=Unknown, 1=Pinter-Type1, 2=DC12, 3=Pinter-Type2 Note that a single ASCII character is used to represent the target printer so that this value will fit into the IFD Directory Entry. |
| Single-page TIFF (16 if MRC model, 0 if binary) |
| TBD for hints, 4 if G4, 7 if JPEG. |
| Omit tag for contone images. Used for Sanity Check |
| Must be identical to the relevant frame dimension, (in scanlines) given the Orientation and imaging directions. |
| Must be identical to the relevant frame dimension, (in pixels/scanline) given the Orientation and imaging directions. |
| 2=inches. Used for Sanity Check |
| (Constrained by PostScript Current Transformation Matrix) |
| n if binary, 288 if contone |
| There are SamplesPerPixel values in the array. 1 if binary or Mask, 8 if contone |
| 1 if binary, 1 for Pixel Hints, 1 for gray, 3 if Lab, 4 if CMYK |
| All layers are identical |
| Indicates single page TIFF. Used for Sanity Check |
| Omit tag for Binary Images |
| Omit tag for Binary Images |
| Same as PostScript, relative to initial CTM |
| Same as PostScript, relative to initial CTM |
| Identical to the name in the PostScript. |

*FIG. 3B*

Hidden Jobs:

| jobID5   | suzie   | 44tex55 |
| jobID6   | suzie   | 44tex55 |
| jobID994 | forJohn | forJohn |
| jobID12  | mikef   | spring4 |
| jobID14  | mikef   | spring4 |
| jobID18  | mikef   | spring4 |
| jobID489 | forJohn | forJohn |

Selected Jobs:

| jobID12 | mikef | spring4 |
| jobID14 | mikef | spring4 |
| jobID18 | mikef | spring4 |

SYSTEMS AND METHOD FOR CONTROLLING HIDE AND HOLD JOBS IN A NETWORK

BACKGROUND

The subject matter of this disclosure relates to controlling access to printed documents, and to printing desired print jobs as a batch at a predetermined time.

Within an office or print shop environment, a single user may want to print multiple documents. With an active printer, however, other jobs may enter a print queue in-between multiple print jobs that the user has submitted over a period of time. There may also be times when the user may want to be present during printing to retrieve the printed documents. For example, if the content of one or more print jobs is confidential, a user may wish to obtain the printed documents immediately upon completion of the print job or jobs.

In a network environment, a print job generated at one location on the network can be printed at another location. On occasion, it may be necessary or desirable to print a document containing confidential or otherwise sensitive information. Because such information may be sent to a networked or group printer, the sender may want to protect the transmission from electronic interception, or at least prevent unauthorized viewing of the hard copy printout. A known method to prevent such a transmission from being electronically intercepted is the use of encryption protocols such as SSL (Secured Socket Layers) or TLS (Transport Layer Security). Such encryption protocols will not prevent unauthorized viewing of a hard copy printout or viewing of print jobs stored in a print queue.

For example, if a print job sent to a printer contains privileged or confidential information, and the sender cannot be present to retrieve the hard copy printout, the hard copy printout is then viewable to any person at the printer. Furthermore, upon entering the print queue, the print job having privileged or confidential information is likely to be inserted among other print jobs in the print queue. Accordingly, the sender of the print job would then have to wait at the printer for any print job inserted in the queue prior to the desired print job before being able to retrieve the sender's print job. This problem becomes exacerbated if the sender has multiple print jobs in the print queue.

U.S. Pat. No. 5,633,932 discloses a sender node that encrypts a print job and a printer node that decrypts the print job prior to printing. In the event the print job contains confidential information, the sending node generates an encrypted portion using a public key of the printing node. The printing node contains a private key and upon receiving the encrypted print job, decrypts the portion to ascertain whether the print job requires authentication by the intended recipient before printing. In the event such identification is needed, the print job is stored in the encrypted form until the print node receives the proper authentication from the intended recipient.

U.S. Pat. No. 6,862,583 also discloses the encryption of print data by print node and storing the encrypted data without printing until the print node receives proper authentication from the intended recipient. U.S. Pat. No. 6,862,583 discloses that the print job is not required to be encrypted at the sending node before being sent to the print node but in order to provide secured data transmission over a network, a secured data transmission protocol, such as SSL or TLS can be used to provide a more efficient transmission from the sending node to the print node. Smart-cards or smart-card chips are preferably utilized to supply the authentication to the print node. The smart-cards are preferably ready by a smart-card reader located at the image forming device and connected to the print node so that the print node can confirm that the intended recipient is present at the image forming device when the image is printed.

A smart-card interface is attached to a desktop computer for interfacing with a smart-card of a computer user. The smart-card provides a mechanism whereby a computer user can authenticate the user's identity to the desktop computer. The smart-card contains a private key of a private/public key pair which is specific to a computer user and which is used to secure the printing of image data. A printer, connected to a network, may include an embedded smart-chip which contains a private key of the private/public key pair corresponding to the printer for use in encryption and/or decryption of data received by the printer. The printer may also be connected to a smart-card interface device, which is capable of interfacing with a smart-card of a print job recipient. In this manner, the printing of a print job for a particular intended recipient may be controlled through the use of a smart-card interface and smart-card in combination with the smart-chip in printer.

SUMMARY

The subject matter of this disclosure provides systems and methods that allow documents to be printed as a batch submission solely for the user and at a predetermined time.

In contrast to known apparatus and methods of controlling authorized printouts of a print job containing privileged or confidential information, the subject matter of this disclosure does not rely on the use of encryption or public/private key pairs embedded in smart-chips and/or smart-cards. In an exemplary embodiment of the subject matter of this disclosure, a client may include a user name/password as a printer attribute, or similar job ticket attribute, in a print job submission if the user wants to hide and hold their print job submissions for printing until a later time.

The subject matter of this disclosure provides systems and methods whereby a client requests a "Hide and Hold" job operation by submitting a user/password or other attribute to have a job(s) invisibly held until a user enters a user name/password. In various exemplary embodiments, the set of held print jobs is exposed and processed as a collection (not requiring a password for each job). In an exemplary embodiment, job-level tagging may be used for identifying a hold request (not explicitly in ID) as a way to simplify the hold process.

From the job submission client, or user, an optional input/ticket attribute is the user name/password. In various exemplary embodiments, encryption may also be used for added password security. In an embodiment, a print job is delivered to the intended print server with an attached job ticket including attributes similar to the following:

```
<xpif>
<holdjobID="keyword">Kate</holdjobID>
<holdjobPW="keyword">blU44</holdjobPW>
</xpif>
```

A server extracts these attributes and sets a flag to not release the jobs to the intended queue of the printer. Because the print jobs are not displayed, other users have no knowledge that the print jobs were submitted. In various exemplary embodiments, a system level option may be implemented requiring a user to include a user name/password. If the user name/password matches any hidden jobs, the related set of print jobs is displayed. The user may then optionally select all or a sub-set of the print jobs for batch submission either immediately (interrupt) or next in order of other print jobs. In addition to the hide and hold features described herein, the full set of features for any other inactive job are available to the user. For example, print jobs may be updated, forwarded, previewed, etc.

By hiding and holding the print jobs, the submission of the print job will be hidden from others not authorized to view the submission, and the print jobs will be held from printing until a predetermined time. Upon receiving such attributes, a server will hide and hold the print job, or multiple print jobs. The user may subsequently enter a user name/password to display their print jobs, or choose a selection to print a plurality of print jobs as a batch. The print jobs will then print together when the user desires without other print jobs inserted amongst the print jobs of the users batch.

BRIEF DESCRIPTION OF THE DRAWINGS

Various exemplary implementations of the system and methods of this application are described in detail with reference to the following figures, wherein.

DETAILED DESCRIPTION OF EMBODIMENTS

When a user submits a printer ready application or print job to a networked printing device, the print job is sent to the destination printer through a print driver. In a busy production or office environment, print jobs enter a print queue and are printed in the order they are received. The systems and methods of this disclosure include a user name/password as a job attribute on a job ticket to be sent along with the print job as an attribute for controlling/allowing the viewing and/or release of print jobs at a print server.

Figure 1:
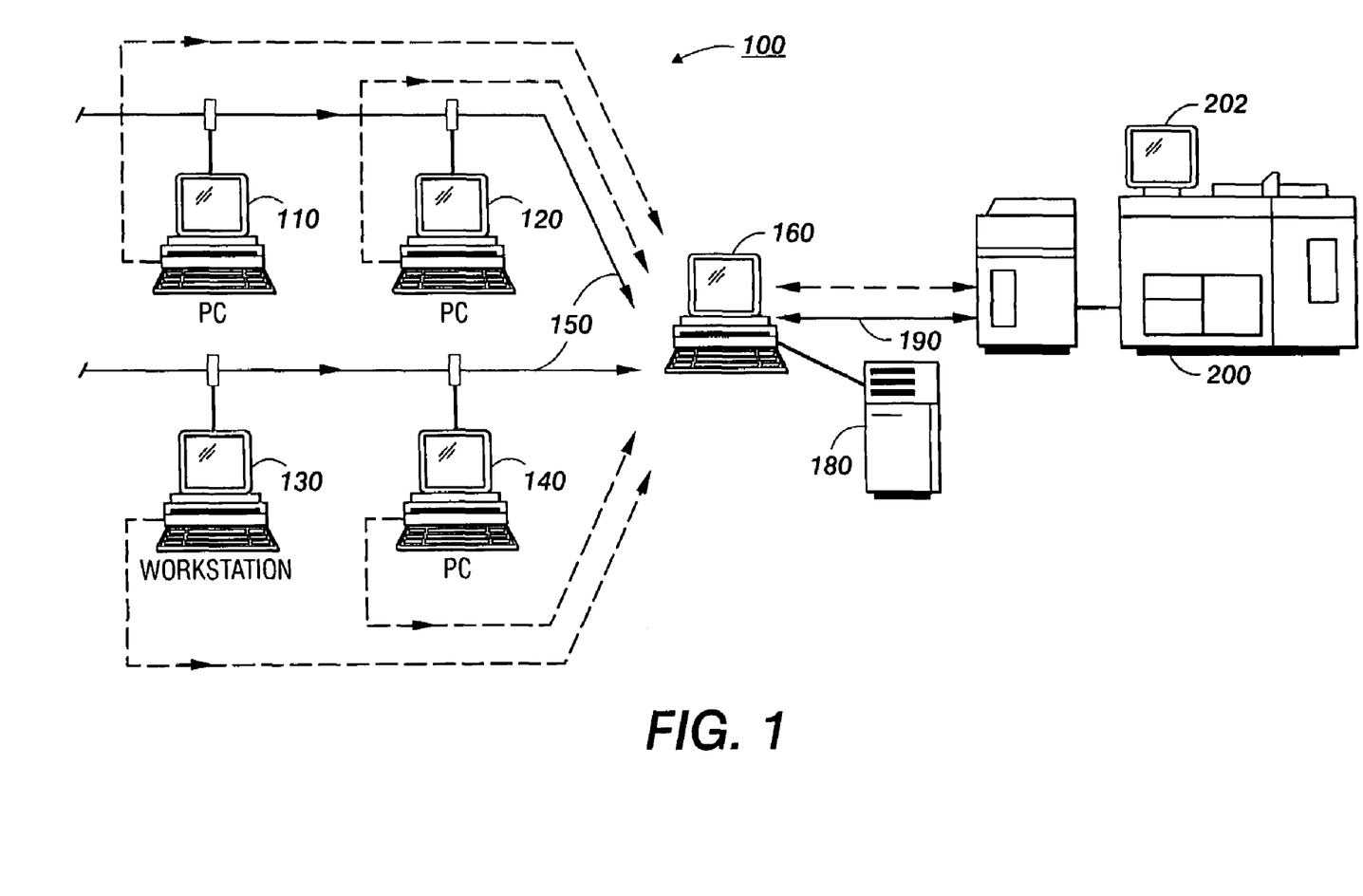
FIG. 1 is a schematic view of a networked printing system.

FIG. 1 shows a schematic view of a networked printing system 100 including a plurality of input devices 110, 120, 130 and 140 connected to a printing apparatus 200 by a server 160 via a link 190. The input devices 110, 120, 130 and 140, can be any known or to be developed input device, such as a desk-top computer, a lap-top computer, a personal digital assistant (PDA), a mobile telephone, or the like. The printing apparatus may be any known, or to be developed printing device such as a digital copier, printer, scanner, facsimile machine, or the like. The link 200 can be any known or later developed device or system for connecting an input device 110, 120, 130 and 140 to the printing apparatus 190 having a display 202, including a direct cable connection, a connection over a wide area network or a local area network, a connection over an intranet, a connection over the Internet, or a connection over any other distributed processing network or system. In general, the link 190 can be any known or later developed connection system or structure usable to connect the input device 110-140 to the printing apparatus 200.

As shown in FIG. 1, the plurality of input devices 110, 120, 130 and 140 may be personal computers, or workstations. The user input devices 110, 120, 130 and 140 are coupled via one or more networks 150 to a server 160. In various exemplary embodiments, the server 160 may be any suitable interface for receiving print jobs from the input device 110, 120, 130 and 140 via one or more networks 150. The server 160 may include a memory 180 having suitable capacity for temporarily storing files pending processing by the printing system 100. The memory 180 may be large enough to support long term storage of such files or parts of such files. The memory 180 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-writeable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like. Although a image forming device 200 having a memory is described, in various exemplary embodiments one or more remote memories may be provided for this purpose.

In various exemplary embodiments of the systems and methods according to this invention, the printing system 100 may include one or more high speed printers 190 for processing print jobs in accordance with the instructions input through a job ticket 220 (FIG. 2) accompanying a print job. Although a single image forming device 200 is shown in FIG. 1, the systems and methods according to this disclosure contemplate, a plurality of printers, either at a single central location or at several remote locations. Additionally, although the networks 150 are described as being separate or independent of each other, it should be appreciated that in various exemplary embodiments a single network may also be used. In various exemplary embodiments of this invention, the network 150 can be a local area network, a wide area network, an intranet, the Internet, or any other distributed processing and storage network.

Figure 2:
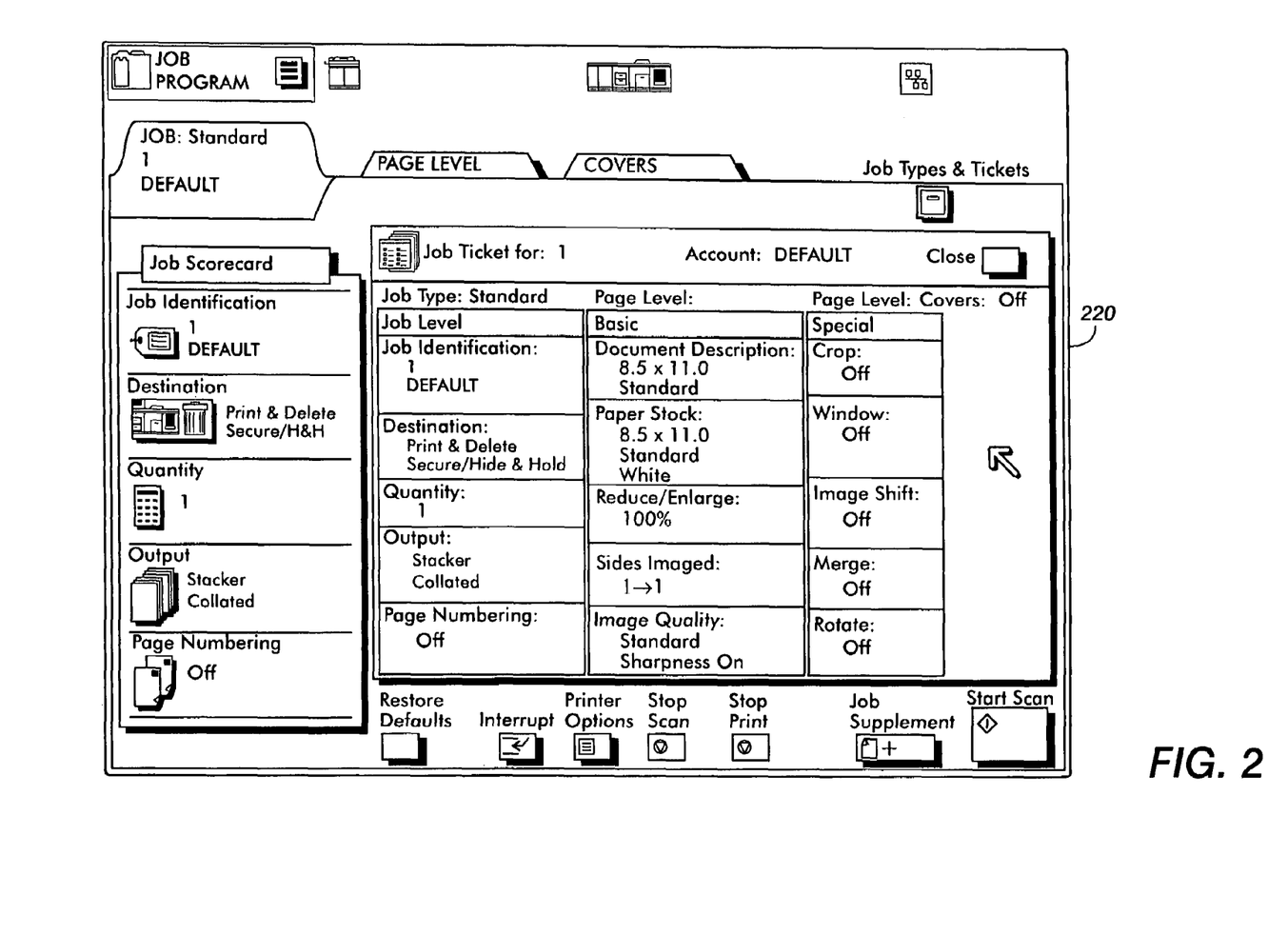
FIG. 2 shows a schematic view of an exemplary job ticket.

In most print jobs, there are a number of different attributes sent to the print driver. Such attributes may include, for example, quantity of pages of the print job, number of copies of the print job needed, finishing options, and the like. An aspect of an exemplary embodiment of this disclosure may include a user name/password to be optionally sent to print driver as an additional attribute. Such attributes are forwarded through the job ticket 220 attached to the print job. The print server 160 understands the meaning of each of the attributes.

FIG. 2 shows a schematic view of an exemplary job ticket 220 having a variety of different attributes. In various exemplary embodiments, the job ticket 220 is created as a stand alone file at one or more of the user input devices 110, 120, 130 and 140. The job ticket 220 may be in the form of a page description language file such as in an XML (eXtensible Markup Language), or other SGML (Standard Generalized Markup Language) format, for transfer to the memory of the image forming device 200. The job ticket 220, and the page description language files referencing the attributes, are transferred to the memory of the image forming device 200 as two distinct objects that together may be referred to as a print job. The print job may consist of, for example, processing instructions sent to the selected image forming device 200 via Internet Print Protocol, or the like.

According to an aspect of the systems and methods of this disclose, a user of the printing system 100 may include additional attributes in the form of a user name/password to a print job at a user input device 110, 120, 130 and 140. From the user input devices 110, 120, 130 and 140, an optional input/ticket attribute is added as the user name/password. In various exemplary embodiments, encryption may also be used for added password security. In an embodiment, the print job is delivered to the intended print server 160 with an attached job ticket 220 including attributes similar to the following:

```
<xpif>
<holdjobID="keyword">Kate</holdjobID>
<holdjobPW="keyword">blU44</holdjobPW>
</xpif>
```

These attributes or job ticket elements are joined with the existing collections of attributes, such as copy count and color adjustment, for example. The attributes are sent with the requested print job as an attached job ticket or job instruction document similar to that shown in FIG. 2.

Figure 3A:
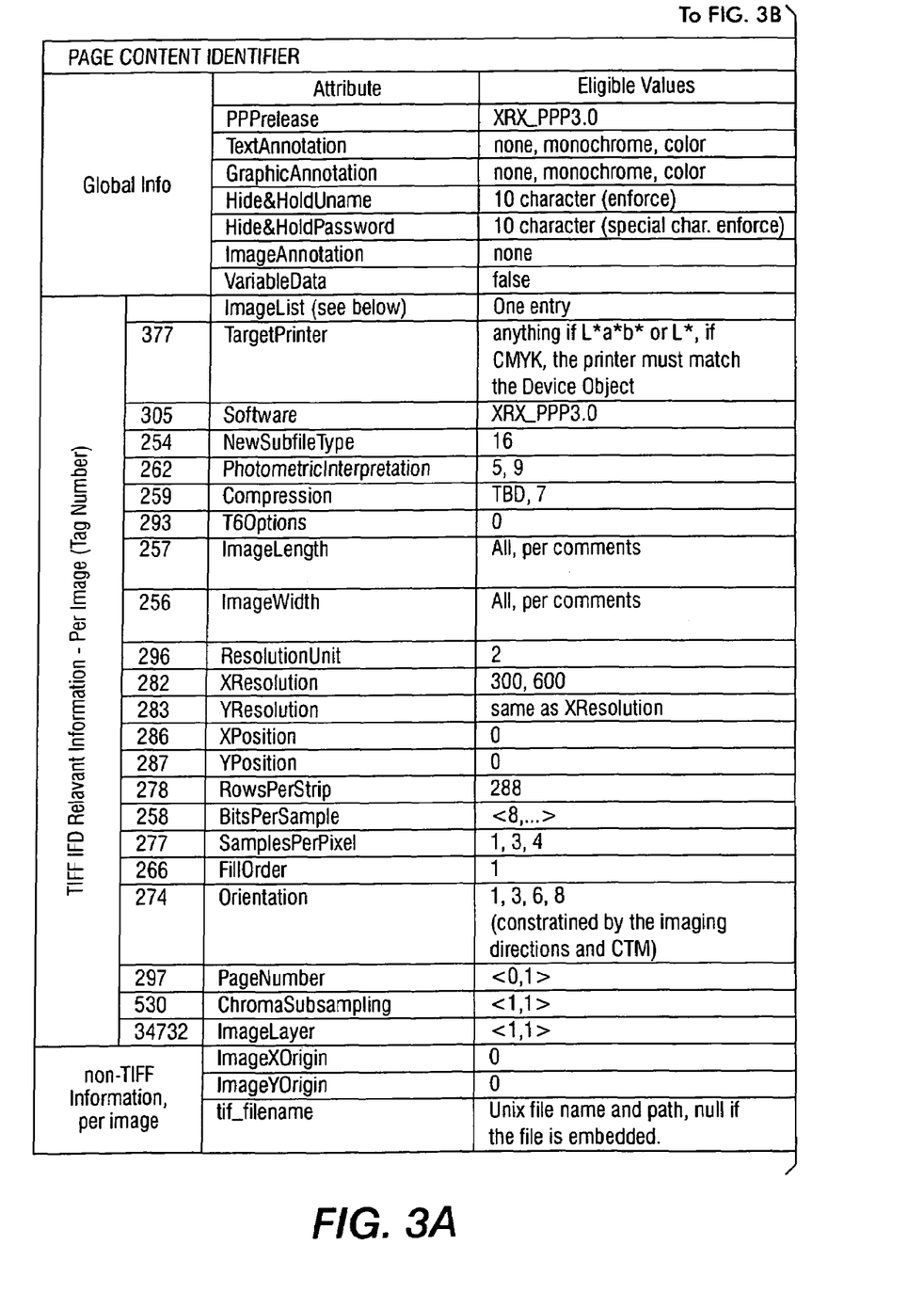
FIGS. 3A and 3B illustrate an exemplary embodiment of a set of page attributes usable by the systems and methods according to this disclosure.
Figure 3B:
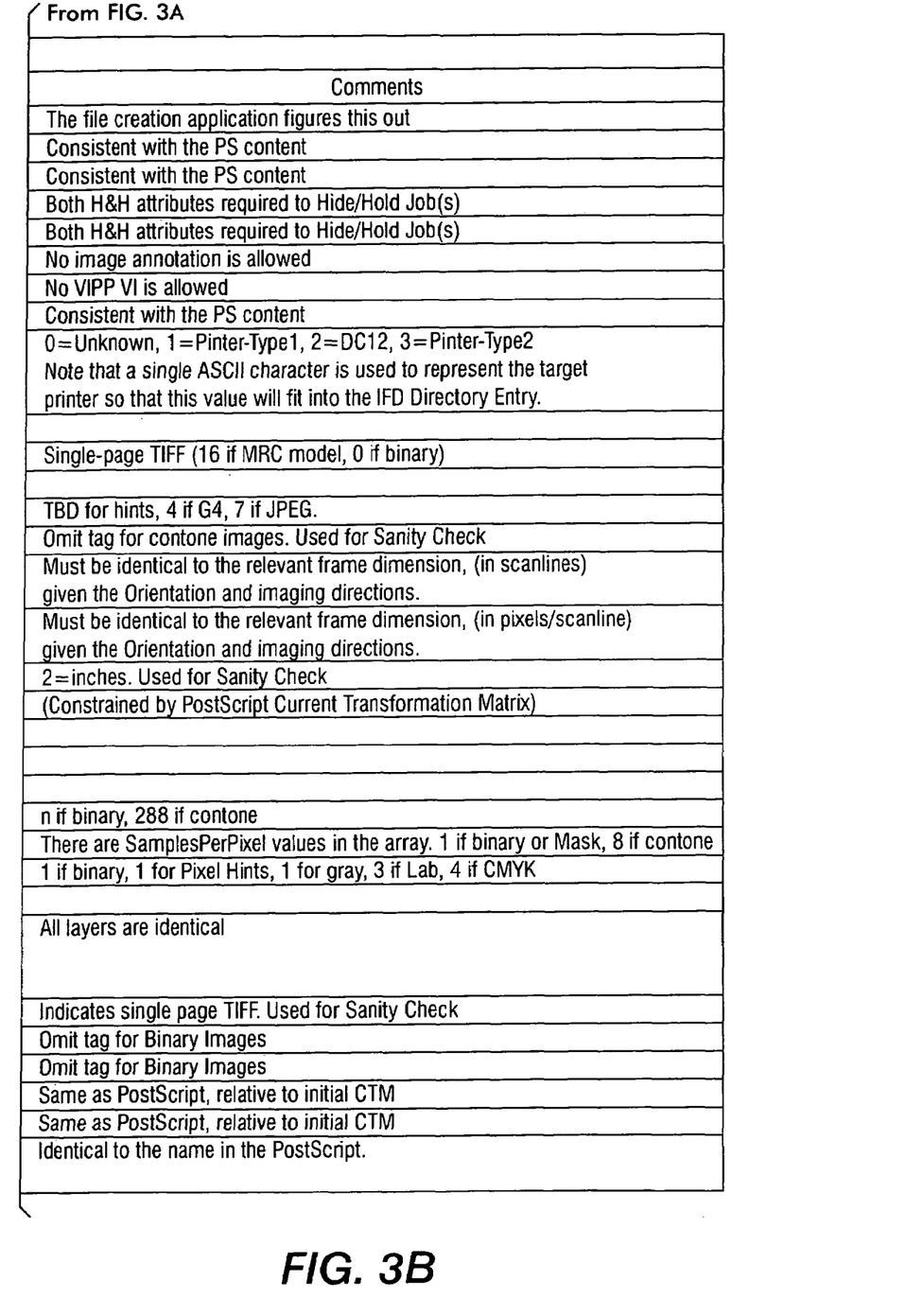

In various exemplary embodiments of this invention, one or more page description language files referencing the user name/password may be created on one or more of the user input devices 110, 120, 130 and 140 to provide the desired attributes. The page description language may be, for example, Adobe's PostScript™ or other known or later developed page description language suitable for the purposes described herein. In addition to the user name/password, the page description language file may be used to describe other attributes, such as pointers for headers, footers, page numbers, other image data, and/or the like (See generally FIGS. 2-3B). The page description language file may also be used to express image placement on a sheet by offering a page transform matrix and coordinate system. Although use of a page description language is contemplated, a page description language file may not be necessary in the execution of various exemplary embodiments of the systems and methods according to this invention. For example, in various exemplary embodiments, if the requested document consists of only captured images, use of a page description language may not be necessary or desired.

The print job, including the job ticket 220, is ultimately transferred to the image forming device 200 and is received and spooled in the memory of the image forming device 200. However, before being transferred to the memory of the image forming device 200 for spooling, the print job is received at the server 160 where it is determined whether the job ticket 220 includes a user name/password identifying the print job as a print job to be hidden and held apart from other print jobs.

When pass worded print jobs, or a group of pass worded print jobs, are received at the print server 160 with job ticket attributes for the user name/password, the print server 160 does not release the print job to the image forming device 200. Rather, the data representing those print jobs is hidden and held at the memory 180 of the system 100 and can only be viewed if the proper input parameters of the print job that match the user name/password are entered at the image forming device 200 at a later time. In various exemplary embodiments, the hidden and held print jobs may be viewed at a location other than the image forming device 200, such as at the server 160, upon entering the proper user name/password.

Figure 4:
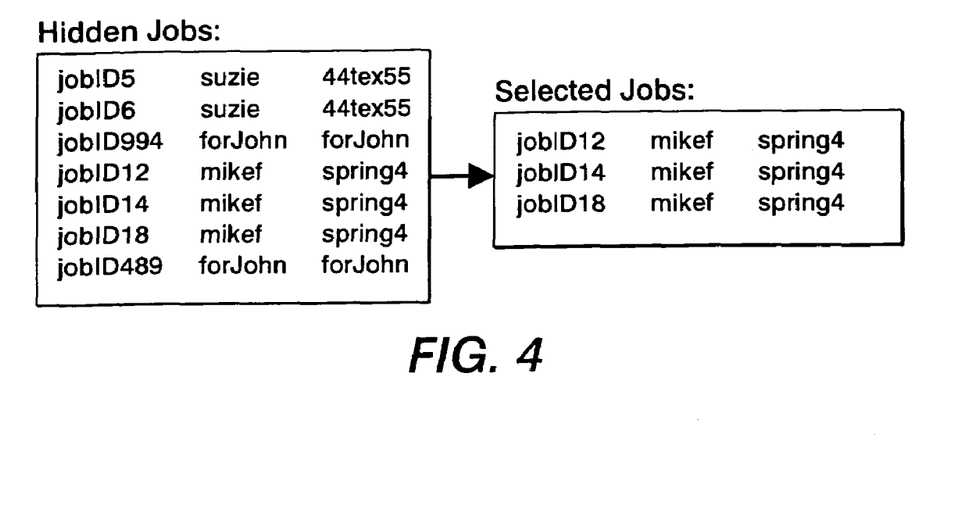
FIG. 4 is an exemplary view of hidden and held print jobs.

In various exemplary embodiments, a user can send a print job from a location remote from the destination image forming device 200 and later, when the user is physically present at the destination image forming device 200, have the print job or jobs printed. In an embodiment, the user can view the hidden print jobs at a window on the image forming device 200, or on the display 202 connected to the image forming device 200, by entering the correct user name/password at a keypad (not shown) on the image forming device 200. The user can then select those print jobs to be printed. FIG. 4 shows an exemplary view of hidden and held print jobs that are viewable at the display 202 of the image forming device 200 upon entering the proper user name/password. The user can then select those print jobs currently held for printing. For example, of the seven hidden jobs shown in FIG. 4 that the user has access to through entering of the password, the user has selected three of the hidden jobs for printing.

Figure 5:
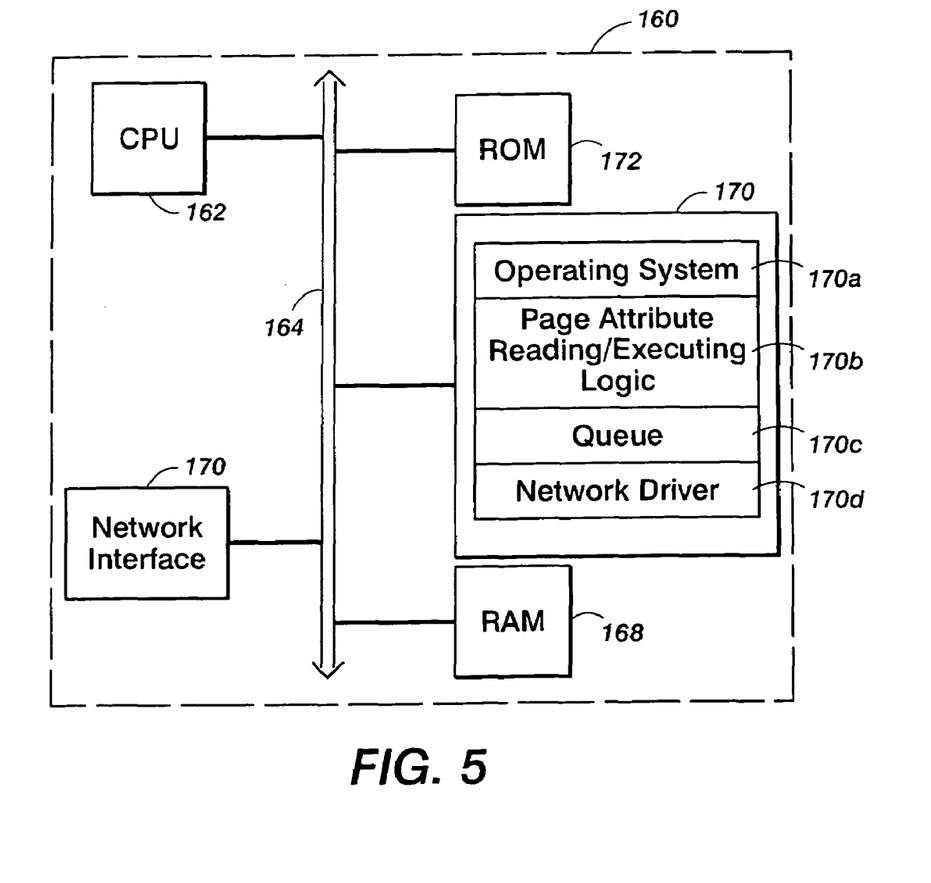
FIG. 5 is a block diagram showing the server shown of FIG. 1 capable of implementing the systems and methods of this disclosure.
Figure 6:
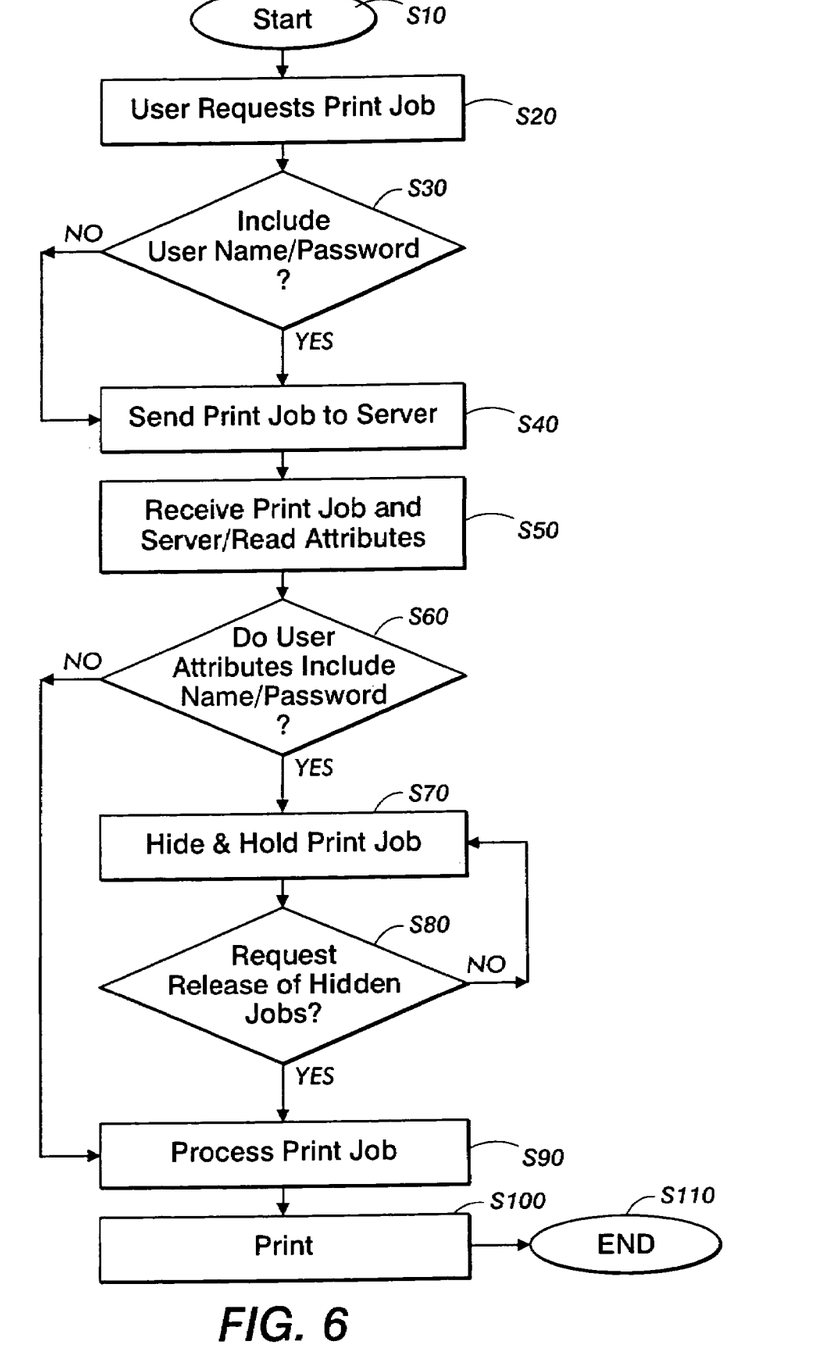
FIG. 6 is a flowchart illustrating an exemplary embodiment of a method according to the systems and methods of this disclosure.

FIG. 5 is a block diagram block diagram showing the server 160 shown of FIG. 1 capable of implementing the systems and methods of this disclosure. In FIG. 4, an exemplary embodiment of the server 160 includes a central processing unit ("CPU") 162, such as a programmable microprocessor, operably connected to a bus 164. A network interface 166, for operably connecting the networks 150 to the sever 160, is also included in the server 160. A random access memory ("RAM") 168, a hard disk 170, and read-only memory ("ROM") 172 are also operably connected to the bus 164. As is well known in such systems, the RAM 168 may interface with the bus 164 to provide the CPU 162 with access to the memory to provide "run-time" memory for the CPU 162. For example, in the event programs stored in a memory are executed, the CPU 162 sends program instructions from the hard disk 170 to the RAM 168 via the bus 164 and the program instructions are executed.

The ROM 172 stores instructions, such as start-up instructions for the CPU 162 or other basic input/output operating system ("BIOS") instructions for operating peripheral devices that may be attached to the server 160, such as the memory 180 or an image forming device 200.

In an exemplary embodiment, the hard disk 170 may be provided to stores program instructions for an operating system (OS) 170*a*, page attribute reading/executing logic 170*b*, a queue 170*c*, and a network driver 170*d*. Such other files and programs as are normally found on a hard disk may also be provided. The OS 170*a* may be any operating system, such as DOS, Windows, UNIX, or any other operable and compatible operating system. The page attribute reading/executing logic 170*b* may be in the form of software, firmware or hardware. It should also be understood that the page attribute reading/executing logic 170*b* can be implemented as physically distinct hardware circuits within an ASIC, or using a FPGA, a PLD, a PLA or a PAL, or using discrete logic elements or discrete circuit elements.

The queue 170*c* may be used to store print jobs forwarded from one or more user input devices 110, 120, 130, 140 for outputting to the image formation device 200. The network driver 170*d* is used to drive the network interface 166 for operably connecting the server 160 to the networks 150. As discussed above, in an exemplary embodiment, encryption may be used with the systems and methods of this disclosure. In the event encryption is desired, the server 160 may receive encrypted data in the queue 170*c* and maintain such data with a print job or optionally forward the encrypted data to an image forming device 200 for printing.

The received print job is received at the print server and the attached job ticket is read. The print server 160 assigns various print specifications according to the job ticket 220. In an exemplary embodiment, if the job ticket 220 includes attributes for the user name/password, the print server 160 may move the print job to a secure and hidden location. In this way, the hidden jobs, nor a listing of such jobs in a print queue will be viewable through a user interface of the image forming device 200. Thus, a print job having such attributes is hidden from the view of unauthorized users and held from the print queue for future release and printing.

The server 160 extracts these attributes and sets a flag to not release the print job or jobs to the intended print queue. The print jobs are not displayed so that other users have no knowledge that the print jobs were submitted. In an exemplary embodiment, a system level option may be implemented requiring a user to include a user name/password. If the identification matches any hidden jobs, the related set of print jobs is displayed. The user may then optionally select all of a sub-set of the print jobs for batch submission either immediately (interrupt) or next in order of other print jobs. In addition to the hide and hold features described herein, the full set of features for any other inactive job are available to the user. For example, print jobs may be updated, forwarded, previewed, etc.

In various exemplary embodiments of the subject matter of this disclosure, the target image forming device 200 is selected either directly or indirectly by a user, and the print job or jobs are transferred from the user input device 110, 120, 130 and 140 to the printer memory. The print job or jobs may be transferred, for example, by file transfer protocol, or the like. The printer memory may include a disk drive or other known or later developed memory devices. The printer memory can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

FIG. 5 shows a flowchart outlining an exemplary embodiment of a method according to this disclosure for controlling viewing of and access to certain print jobs. As shown in FIG. 5, operation begins at step S10 and continues to step S20 where a print job is requested, i.e., sending a print job to be printed. Step S30 determines whether to include a name/password to control viewing of and access to the print job. If it is determined not to include the name/password, operation continues to step S40 where the print job is sent to the print server at step S40.

In the event it is determined to include a user name/password, a new attribute is created that is included in the job ticket that will accompany the file to be printed. In an embodiment, the print job is delivered to the intended print server with an attached job ticket including attributes similar to the following:

```
<xpif>
  <holdjobID="keyword">Kate</holdjobID>
  <holdjobPW="keyword">blU44</holdjobPW>
</xpif>.
```

Once the attribute is created, operation continues to step S40 where the print job, including the job ticket with the new attribute, is sent to the image forming device. Operation continues at step S50.

At step S50, the print job is received at the server and the job ticket having the attributes is read. At step S60, it is determined whether the job ticket includes an attribute for user name/password. If the job ticket does not include an attribute for user name/password, the print job is passed to the image forming device and enters the queue for processing at step S90.

In the event that the print job includes a job ticket having an attribute for user name/password, operation continues to step S70 where the print job is stored to be held for printing at a later time. The stored print job, or a listing of the print job, is not viewable unless the proper user name/password is entered.

Operation continues to step S80, where the server awaits a request to view and/or release a held and hidden print job or jobs. If no request is received, the print job or jobs are continued to be hidden and held at step S70. In the event a request to view and/or release hidden and held print jobs is received, a determination is made as to whether the request includes the proper user name/password. If the proper user name/password is provided, a list of held and hidden print jobs associated with the user name/password is displayed. An option may be provided for printing all, or any one or more, of the listed print jobs.

Operation continues to step S90, where the print job or jobs are processed for printing. The print jobs are then printed at step S100. For example, the print jobs may be transferred to a selected image forming device via a file transfer protocol. Operation continues to step S110 where operation ends.

By hiding and holding the print jobs as described in the exemplary embodiment, the submission of the print job will be hidden from others not authorized to view the print job and the print job will be held from printing until a predetermined time. The user may subsequently enter a user name/password to display their print jobs or choose a selection to print a plurality of print jobs as a batch. The print jobs will then print together, and when the user desires, without other print jobs inserted amongst the print jobs of the users batch. Although the exemplary systems and methods described contemplate the creator of the user name/password retrieving the print jobs by entering the proper user name/password, the user name/password may also be provided to another to retrieve the print jobs. For example, a person at a location remote from the creator of the user name/password may be given the proper user name/password to retrieve confidential documents sent to a printer at the person's location via a network.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, which are also intended to be encompassed by the following claims.

What is claimed is:

1. A method for controlling viewing and printing of an image on a network, comprising:
   requesting print data;
   determining the presence of an attribute requiring user authorization in the print data;
   hiding and holding, by a device on the network, the print data having the attribute requiring user authorization from viewing and printing to prevent unauthorized viewing or printing of the print data;
   receiving a user authorization while the print data is being hidden and held;
   determining that the received user authorization matches the user authorization required by the attribute in the print data; and releasing the print data that has been hidden and held for viewing and printing upon determination that the received user authorization matches the user authorization required by the attribute in the print data.

2. The method of claim 1, further comprising adding the attribute as a user authorization print job attribute to the print data as one of a plurality of print job attributes in a print job ticket.

3. The method of claim 2, further comprising adding the user authorization print job attribute as one of the plurality of print job attributes using an input device.

4. The method of claim 2, further comprising forwarding the user authorization print job attribute to a print server in the print job ticket as a stand alone file attached to the print data.

5. The method of claim 2, wherein the print job ticket is in the form of a page description language format.

6. The method of claim 2, wherein the determining the presence of the attribute requiring user authorization in the print data includes extracting print job attributes from the print data and setting a flag to not release the print data to an image formation device if the user authorization print job attribute is detected.

7. The method of claim 2, wherein the hiding and holding the print data having the user authorization print job attribute includes storing the print data in a memory.

8. The method of claim 2, wherein the releasing the print data having the user authorization print job attribute for viewing and printing includes receiving user authorization at one of a print server and an image formation device.

9. The method of claim 2, further comprising viewing the print data corresponding to the user authorization print job attribute, and selecting desired print data for printing from the viewable print data.

10. The method of claim 1, further comprising printing the print data at an image formation device.

11. The method of claim 10, wherein the image formation device is a xerographic system.

12. A system for controlling viewing and printing of an image on a network, the system comprising:
a memory that stores executable program instructions and print data; and
a processor that executes the executable program instructions, and controls the system to:
receive the print data,
detect in the print data a print job attribute for controlling the viewing and the printing of the image related to the print data,
set a flag to not release the print data if the print job attribute that is detected requires user authorization to display or print the print data,
receive user authorization while the flag is set to not release the print data,
determine that the received user authorization matches the user authorization required by the print job attribute in the print data, and
release the print data for which the flag has been set to not release the print data upon determination that the received user authorization matches the user authorization required by the print job attribute in the print data.

13. The system of claim 12, wherein the memory stores the print data in a first location where the print data is not viewable without authorization if the print job attribute requires user authorization to display or print the print data.

14. The system of claim 13, wherein the memory stores the print data in a second location if the print job attribute does not require user authorization to display or print the print data.

15. The system of claim 13, further comprising the processor controlling the system to display a list of the print data that is viewable upon authorization, and controlling at least one of the print jobs to be selected for printing.

16. The system of claim 12, further comprising the processor adding the print job attribute to the print data as one of a plurality of print job attributes using an input device.

17. The system of claim 12, further comprising the processor forwarding the print job attribute to a printer in a print job ticket as a stand alone file attached to the print data.

18. The system of claim 12, further comprising an image formation device that forms an image represented by the print data.

19. The system of claim 18, wherein the image formation device is a xerographic system.

* * * * *